United States Patent

Funakubo et al.

[11] 4,178,472
[45] Dec. 11, 1979

[54] VOICED INSTRUCTION IDENTIFICATION SYSTEM

[75] Inventors: Hiroyasu Funakubo, Tokyo; Masataka Shiba, Yokohama, both of Japan

[73] Assignee: Hiroyasu Funakubo, Tokyo, Japan

[21] Appl. No.: 877,394

[22] Filed: Feb. 13, 1978

[30] Foreign Application Priority Data

Feb. 21, 1977 [JP] Japan .................................. 52-17143
Jan. 19, 1978 [JP] Japan .................................. 53-3702

[51] Int. Cl.² .................................................. G10L 1/00
[52] U.S. Cl. ................................................... 179/1 SD
[58] Field of Search ................ 179/1 SD, 1 SB, 1 SC

[56] References Cited

U.S. PATENT DOCUMENTS

| 3,102,165 | 8/1963 | Clapper | 179/1 SG |
| 3,197,560 | 7/1965 | Riesz | 179/1 SC |
| 4,069,393 | 1/1978 | Martin et al. | 179/1 SD |
| 4,084,245 | 4/1978 | Bunge | 179/1 SB |

OTHER PUBLICATIONS

G. Clapper, "Connected Word Recognition System", Dec., 1969, pp. 1123–1126.

Primary Examiner—Kathleen H. Claffy
Assistant Examiner—E. S. Kemeny
Attorney, Agent, or Firm—Blanchard, Flynn, Thiel, Boutell & Tanis

[57] ABSTRACT

A voiced instruction identification system understands commands by examining a pattern of changes in short syllable (mora) sounds. Fundamental frequency is used as one symbolic value of mora for speech or humming sounds.

12 Claims, 25 Drawing Figures

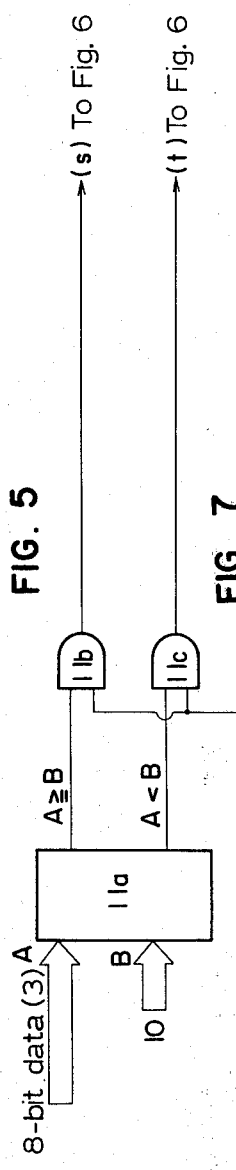
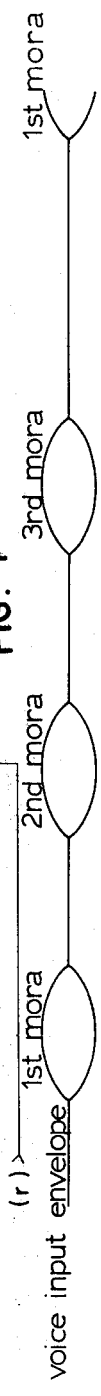
FIG. 5
FIG. 7

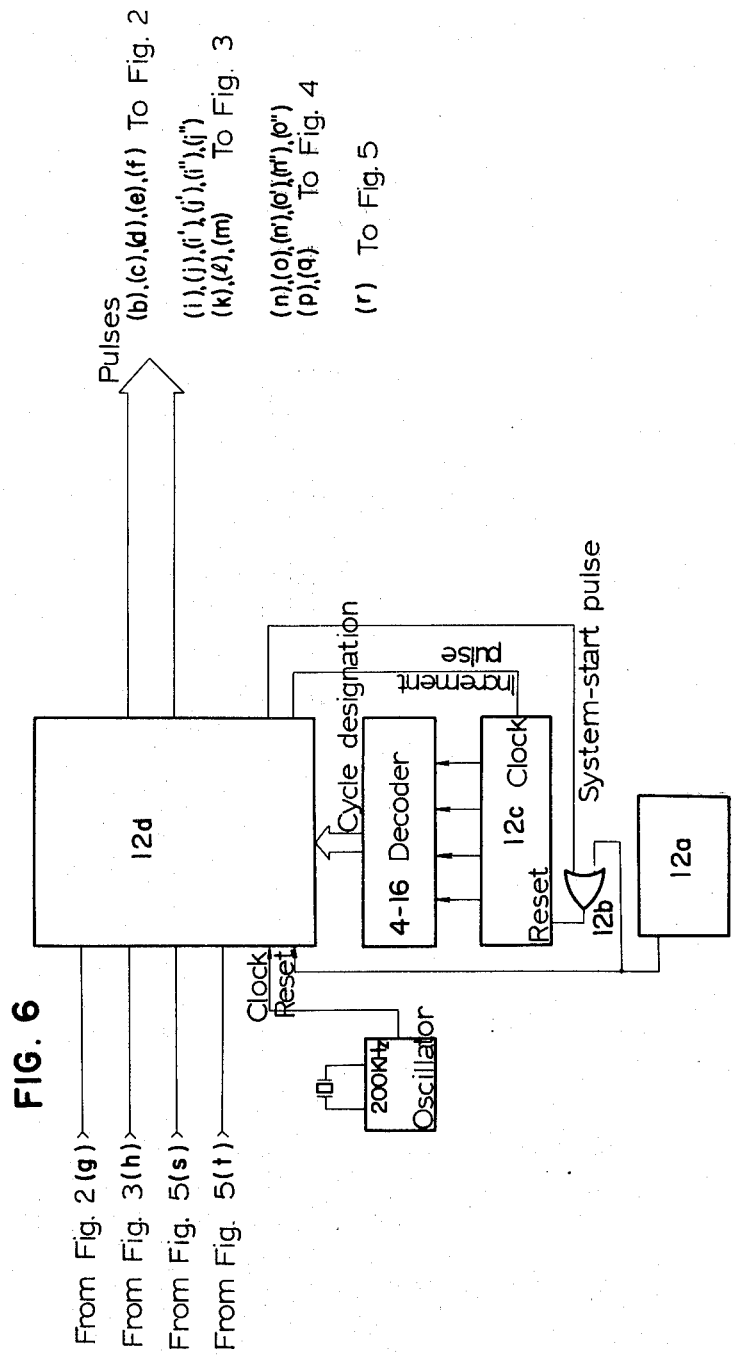

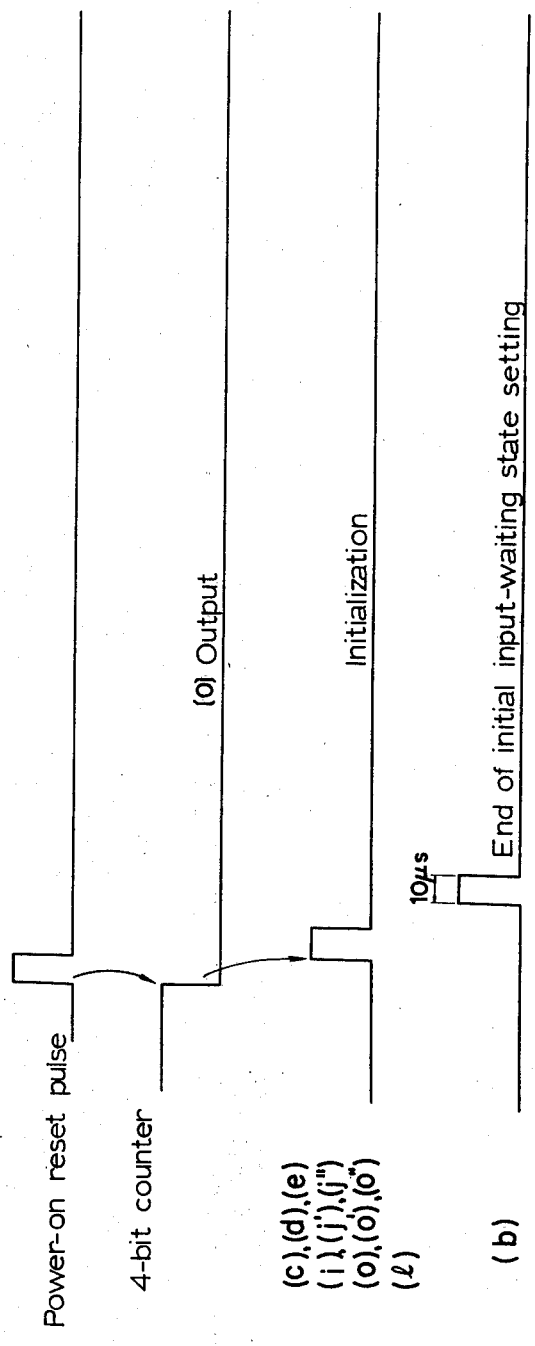

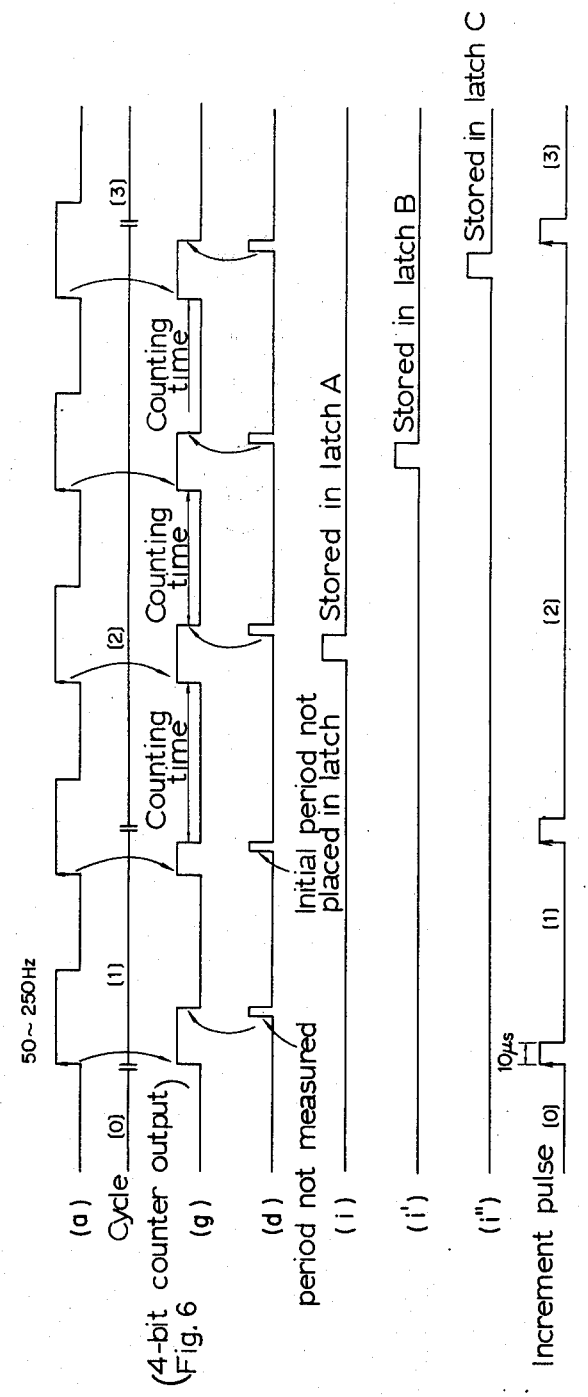

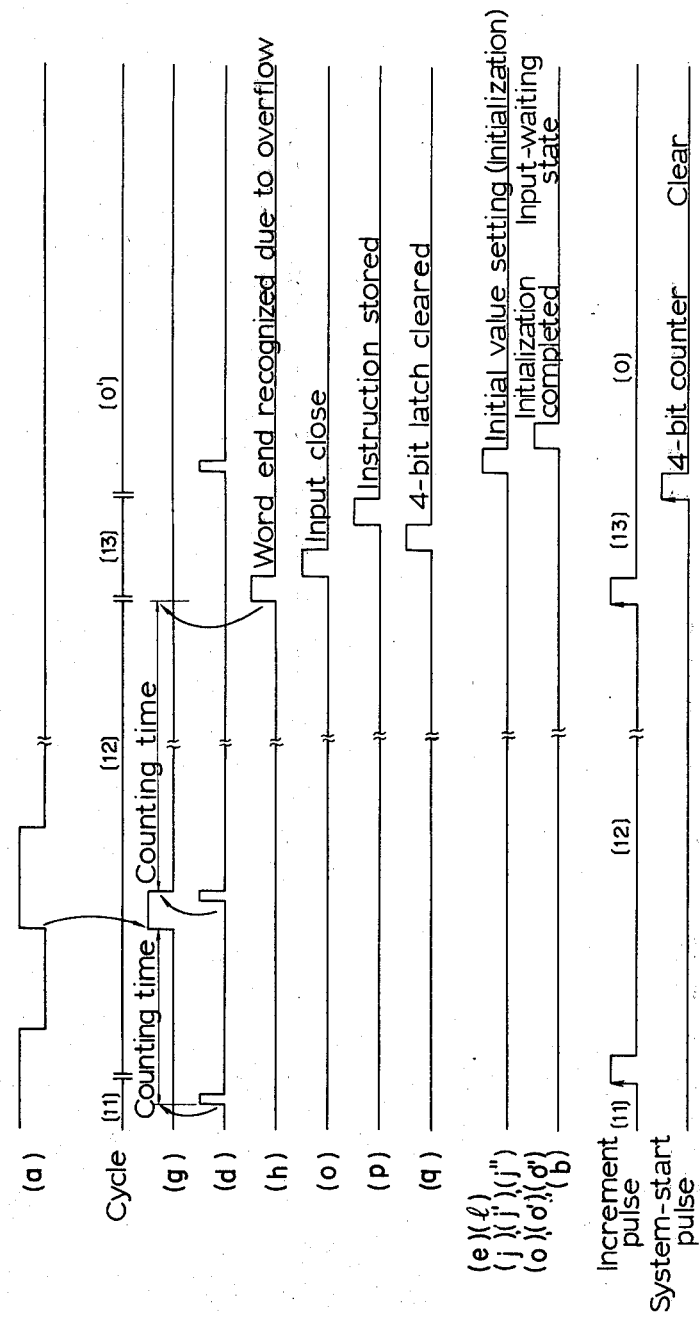

VOICED INSTRUCTION IDENTIFICATION SYSTEM

BACKGROUND OF THE INVENTION

The present invention relates to a voiced instruction identification system for controlling a mechanical or electric device such as powered artificial hands or manipulators by encoding voice signals.

In said type of systems proposed in the prior art, various voice signals from a person constituting a voice source (hereinafter shall be referred to as a source person) have been subjected to frequency analysis to be stored as separate patterns in a memory, and a voice signal generated subsequently thereto by the source person has been subjected to the same frequency analysis to be compared with said stored patterns for determining what kind of voice signal the latter is. However, in such a method according to the prior art as mentioned herein-above, the pattern comparison has encountered many difficulties, because voice signals from the same source person differ from day to day or from time to time in respects of the interval between syllables or pronounciation and, besides, devices required for such prior art systems have been large in size and expensive in cost of production.

The present invention has been achieved with a view to overcoming the aforesaid shortcomings of prior art systems.

SUMMARY OF THE INVENTION

Accordingly, an object of the present invention is to provide a novel voiced instruction identification system which permits vocal information even those comprising humming sounds to be properly identified as well as those comprising ordinary vocal sounds.

Another object of the present invention is to provide such a voiced instruction identification system in which a higher rate of voice recognition can be achieved because a simpler pattern matching system is adopted.

A further object of the present invention is to provide such a voiced instruction identification system in which a multiplicity of instruction words can be properly recognized by means of simplified equipment due to the adoption of a combination of musical interval patterns and rhythm patterns or a further combination of said combination with the stress of sound.

BRIEF DESCRIPTION OF THE DRAWINGS

These and other objects and features of the present invention will be understood from the following detailed description of preferred embodiment thereof set forth with reference to the accompanying drawings, in which:

FIG. 5 is a circuit diagram of the mora pause detecting circuit of FIG. 1;

FIG. 6 is a circuit diagram of the system control unit of FIG. 1;

FIGS. 7 through 11 are timing charts illustrating the timed relationship of the operation of the system according to the present invention;

DETAILED DESCRIPTION OF THE EMBODIMENTS

Figure 1:
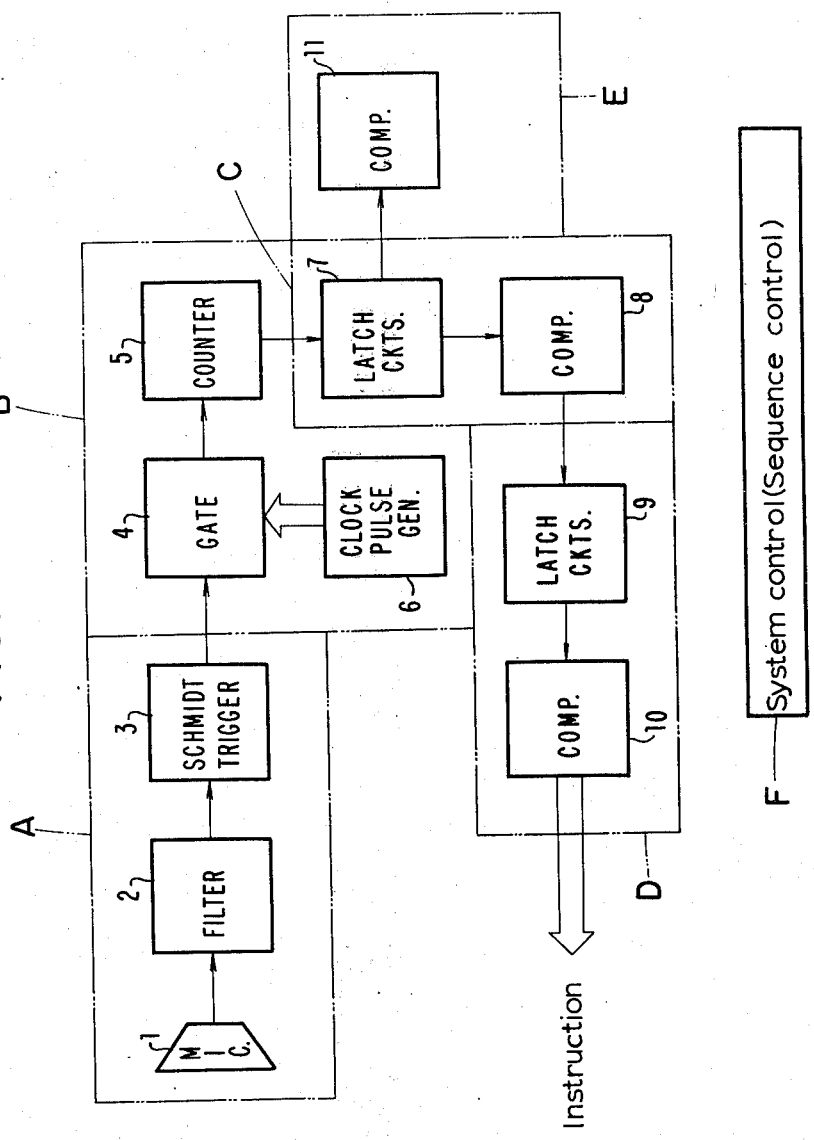
FIG. 1 is a block diagram showing the entire arrangement of the voiced instruction identification system according to the present invention.

Referring now to the drawings, particularly to FIG. 1, showing the block diagram of the entire system, A is a voice detecting circuit which converts voice signals from the source person into pulse signals. In said voice detecting circuit A, the reference numeral 1 designates a microphone provided on the outer wall of the trachea of the source person, and 2 is a filter passing the band of 50 to 250 Hz which is a basic frequency band of the vocal chords vibration. The filter 2 functions to sample the pitch component of voice signal which is a parameter representing the scale of voice sounds as emitted from the source person. Said filter 2 includes an amplifier. Numeral 3 designates a Schmidt trigger circuit which converts the sine wave signal sampled in the filter 2 into a square wave signal. The Schmidt trigger circuit 3 also functions to eliminate those waves other than the pitch components through its hysteresis characteristic.

B designates a counter circuit for measuring by a selected clock the period of the square wave signal output from the Schmidt trigger circuit 3. 4 is a gating circuit for controlling the pulse signal (square wave) input from the Schmidt trigger circuit 3 and selectively controlling clocks. 5 designates a counter for selectively counting, for the duration of the signal input from said voice detecting circuit A, a plurality of clock pulse signals fed from a clock pulse generator circuit 6 to be described herein. The clock pulse generator circuit 6 functions to generate a plurality of clock pulse signals of for example, 10 KHz and 300 Hz.

C designates a symbolic value sampling circuit which stores the number of pulses in each group of the clock pulses from said counter circuit B for determining the symbolic value which is the central value of the number of pulses in the preferred embodiment under consideration. In the symbolic value sampling circuit C, 7 is an array of latch circuits for storing the number of clock pulses in each group, and 8 is a comparator which compares the number of clock pulses fed from the respective latch circuits in said array 7 to determine the symbolic value or central value of the number of clock pulses.

D designates a tonal change detecting circuit which stores the symbolic value for each mora to detect the tone of each mora. In said tonal change detecting circuit D, 9 is an array of latch circuits for storing the symbolic value of each mora, and 10 is a comparator for comparing the number of clock pulses fed from the respective latch circuits 9 to detect the change in the number of clocks, namely, the tone of each mora.

E designates a mora pause detecting circuit which detects mora pauses by using the outputs of said latch circuits in the symbolic value sampling circuits C. In said mora pause detecting circuit E, 11 is a comparator which compares the outputs of the latch circuits 7 with a predetermined value.

F designates a system control unit which supplies pulse signals to the aforesaid respective blocks A through E for providing a sequential controlling function over these blocks. The functional principle of the voice identification system according to the present invention will be described further in detail with reference to FIG. 2 and succeeding drawings on the basis of timing charts included therein.

Figure 10:
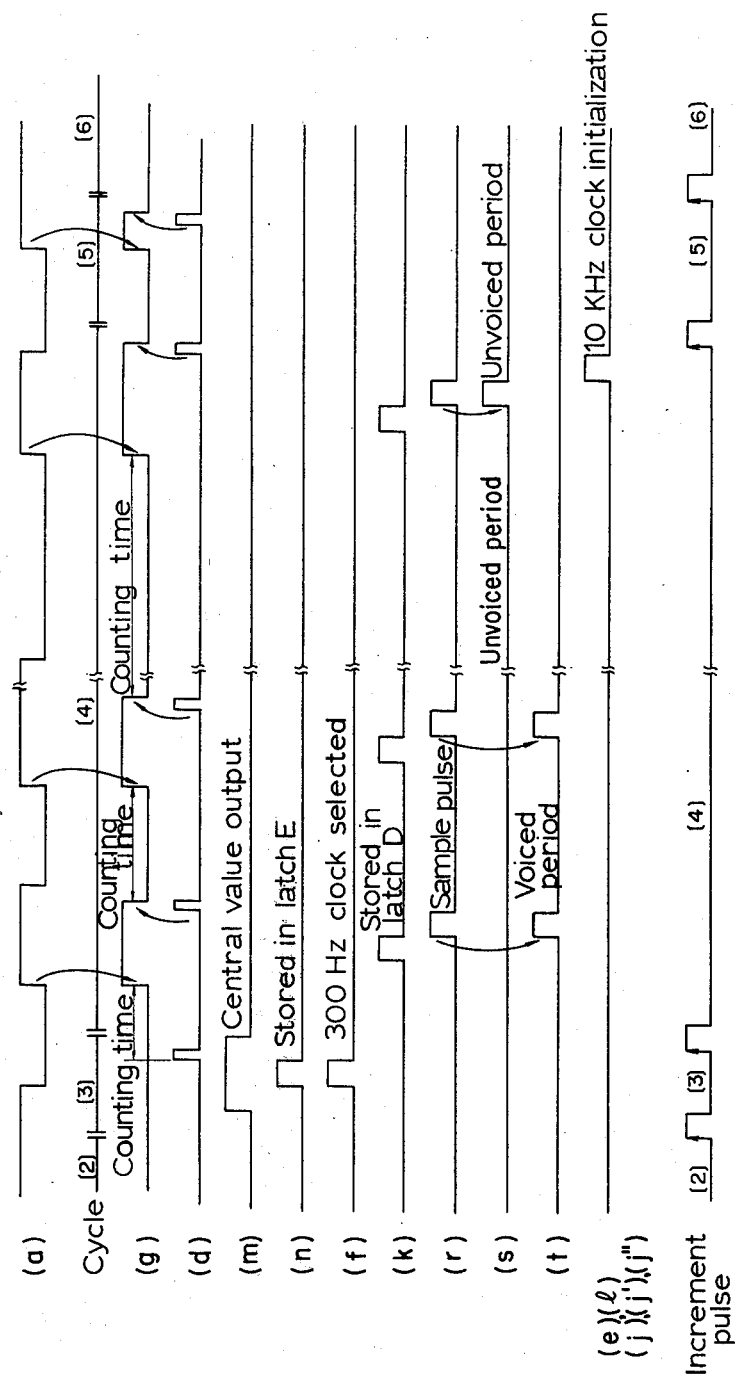

Assuming that three moras (for example [tsu], [ka], and [me] which means "grasp" in the Japanese language when pronounced as a single word) are generated by the source person as shown by voice input envelopes in FIG. 7, the microphone 1 provided on the outer wall of the trachea (preferably, at a position directly below the Adam's apple where higher frequency components and vocal tract characteristic have relatively smaller effects) catches the vocal information generated by the source person. Then, the vocal information is fed into the filter 2 passing the frequency band of 50 to 250 Hz to have the pitch components thereof sampled and amplified therein. The thus sampled sine-wave signal is converted by the Schmidt trigger circuit 3 succeeding thereto into a square-wave signal. For a female voice source, the pass band may be shifted to a higher frequency. Due to the hysteresis characteristic of the Schmidt trigger circuit 3, said square-wave signal undergoes a further elimination of component waves thereof other than the pitch components. This square-wave signal is a Schmidt trigger output in FIG. 7 and illustrated as an enlarged wave form (a) shown in FIGS. 9 to 11.

The sequence of operation of the entire system will be described in detail with reference to FIG. 7. First, [0] denotes an input-waiting cycle, in which all circuits are reset to the initial state thereof. [1], [5] and [9] denote an initial period eliminating cycle corresponding to a building-up period of each mora, in which the unstable portion of the pulse signals (the first pulse in the preferred embodiment under consideration) is eliminated. [2], [6] and [10] denote a cycle in which a pulse (square wave) signal intended to be taken up is determined and, in the preferred embodiment under consideration, three pulse signals from 2nd to 4th pulses (square-wave signals) in each mora are subjected to the measurement of the number of clock pulses therein.

In the cycle designated by [3], [7] and [11], one pulse signal (square wave) symbolic of each mora is selected out of the aforesaid three pulse signals. In the preferred embodiment under consideration, a pulse signal having a central value in terms of the number of clock pulses is selected. However, it may be arranged so that mean value, value giving the least squares, maximum value, minimum value, of the n-th largest value in terms of the number of clock pulses is selected. In other words, any arrangement may be adopted, so long as one pulse signal can be detected out of three in each mora under the same condition. [4], [8] and [12] denote a cycle in which each mora pause is detected. In the cycle designated by [13], the tonal change pattern of the aforesaid three symbolic pulse signals is determined. This tonal change pattern is used to identify the vocal information from the source person for causing the artificial hands to start, for example, its "grasping" action.

Besides the controlling function over the artificial hands, the tonal change pattern may be applied to other uses such as machine tool controlling, financial record controlling, or door movement controlling. The cycles [1] through [13] set forth herein above constitutes one sequence control cycle, after which another information identification sequence succeeding to an input-waiting cycle [0'] will be repeated.

The aforementioned sequence control cycle will now be described further in detail.

If the power switch is turned on, a reset pulse is applied from the power-on reset circuit 12a (FIG. 6) of the system control unit F through OR circuit 12b to the 4-bit counter 12c to reset said counter 12c and the circuit control unit 12d. That is, the 4-bit counter 12c indicates the aforementioned 13 cycles in sequence and is reset to the state [0] by said reset pulse. The thus reset circuit control unit 12d (FIG. 6) simultaneously emits pulses (c), (d), (e), (j), (j'), (j''), (0), (0'), (0'') and (l) as shown in FIG. 8.

Figure 2:
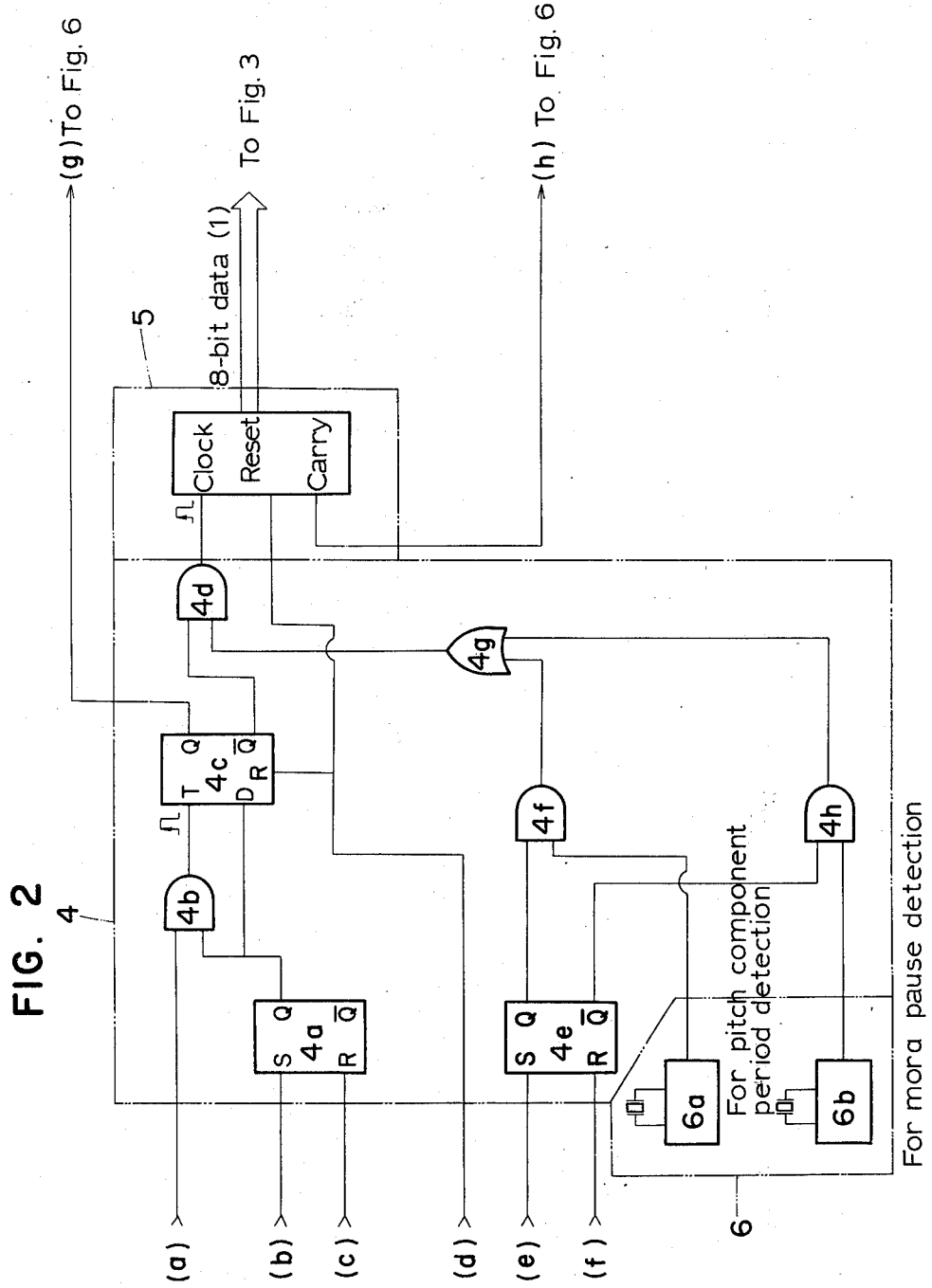
FIG. 2 is a circuit diagram of the counter circuit of FIG. 1.

Said pulse (c) is applied to the reset input terminal of the flip-flop circuit 4a of the gating circuit 4 shown in FIG. 2 to provide an output at the output terminal $\overline{Q}$ thereof. This functions to cut off the voice input until the entire circuit of the system is set. That is to say, an AND circuit 4b is closed to inhibit the passage of the pulse supplied from the Schmidt trigger circuit 3 (hereinafter shall be referred to as vocal pulse signal (a)), because an output is not emitted from the output terminal Q. The pulse (d) resets the 8-bit counter 5 and the flip-flop circuit 4c so that, when the vocal pulse signal (a) is input, an output is emitted from the terminal $\overline{Q}$ of the flip-flop circuit 4c and the 10 Kz or 300 Hz clock to be described later is input to the counter 5 through the AND circuit 4d. The pulse (e) sets the flip-flop circuit 4e to emit an output from the terminal Q thereof and bring the AND circuit 4f into its enabled condition for passing the clock pulse from the 10 KHz clock pulse generator circuit 6a. In this course, since the AND circuit 4d is also enabled, the 10 KHz clock pulse from the clock pulse generator circuit 6a is input to the 8-bit counter 5 through the AND circuit 4f and the OR circuit 4g to be counted by said counter 5. The pulses (j), (j'), (j''), (l), (0), (0') and (0'') reset the 8-bit latches 7a, 7b, 7c and 7d, and 9a, 9b and 9c, respectively, into their input-waiting states as shown in FIGS. 3 and 4.

Then, since the circuit control unit 12d emits the pulse (b) in FIG. 2, the flip-flop circuit 4a is set and its output appearing at the terminal Q is applied to the AND circuit 4b and the terminal D of the flip-flop circuit 4c. Under these conditions, if the first pulse of the vocal pulse signal (a) is applied to the input of the AND circuit 4b, said pulse is passed therethrough to be applied to the terminal T of the flip-flop circuit 4c. In this case, since the output is changed over to the terminal Q at the leading edge of said pulse (a), the pulse (g) is emitted from said terminal Q (FIG. 9). At the same time, an increment pulse is fed to the 4-bit counter 12c to advance the cycle [0] to cycle [1]. Then, the pulse (d) is again fed out from the circuit control unit 12d to reset 8-bit counter 5. Also, the flip-flop circuit 4c is reset to change its output to the $\overline{Q}$ side. Therefore, although the 8-bit counter 5 starts to count the clock pulses again, it is reset by the second pulse of the pulse (d) without transmitting the output thereof to the succeeding stage even when the pulse (g) is produced at the leading edge of the second pulse of the pulse (a), because the first pulse is omitted. After the second pulse of the pulse (a) being input, namely, after the lapse of the building-up transient period, the output of the circuit 4c is again changed over to the $\overline{Q}$ side and, therefore, the 8-bit counter 5 starts to count the 10 KHz clock pulses again. Also, an increment pulse is applied from the circuit control unit 12 to the 4-bit counter 12c to advance the cycle [1] to cycle [2].

Figure 3:
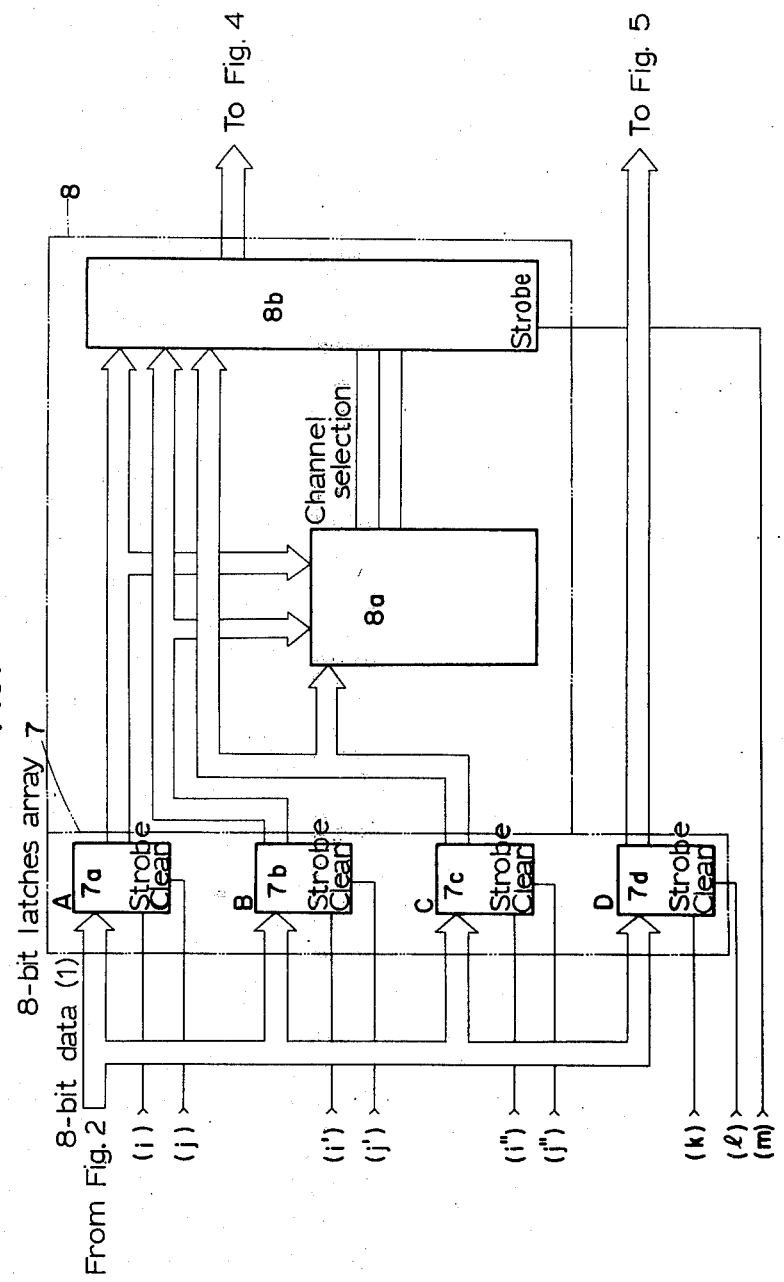
FIG. 3 is a circuit diagram of the symbolic value sampling circuit of FIG. 1.
Figure 4:
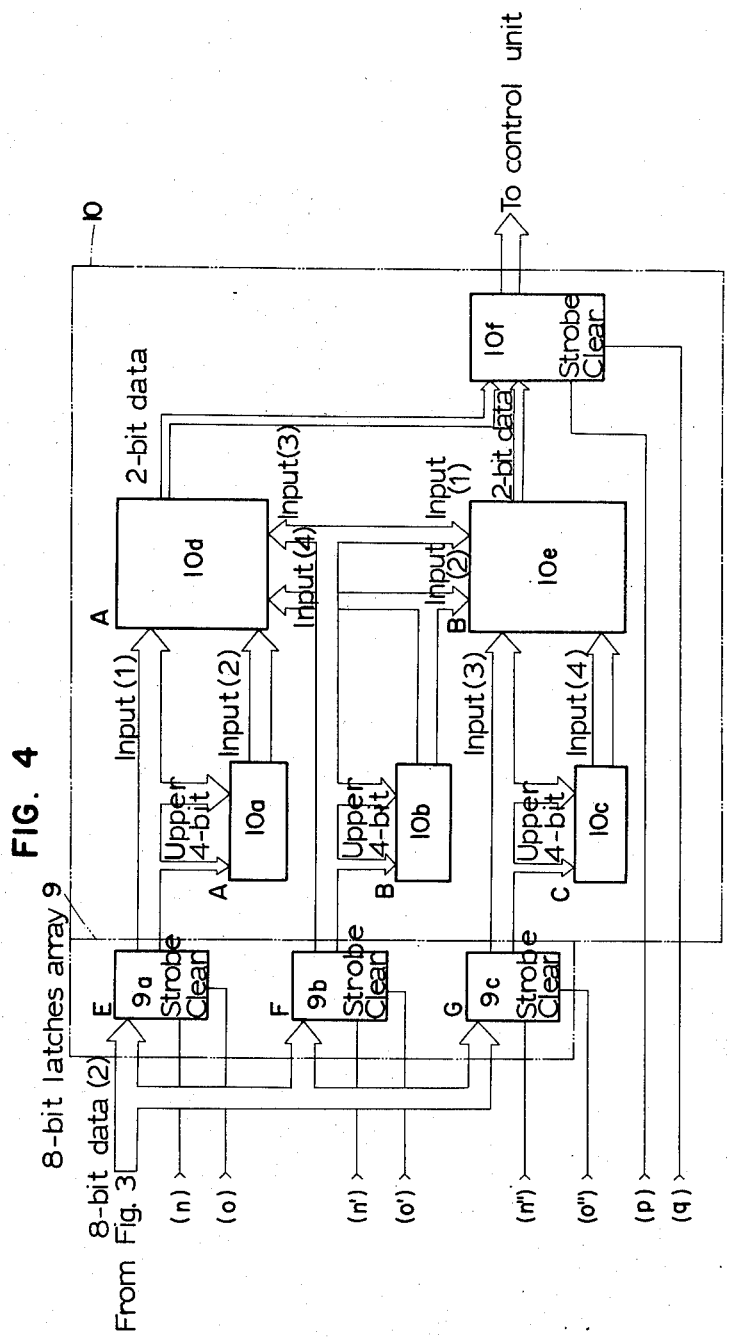
FIG. 4 is a circuit diagram of the tonal change detecting circuit of FIG. 1.

Thereafter, if the third pulse of vocal input pulse (a) appears and the third pulse of the pulse (g) is generated at the leading edge thereof, the circuit control unit 12d produces the pulse (i), which is applied to the strobe input terminal of the latch 7a shown in FIG. 3. Thus, the count signal from the 8-bit counter 5 is stored in the latch 7a. Further, the pulse (d) is emitted subsequently to the pulse (i), and the 8-bit counter 5 is reset again to start the counting operation, which is continued until the fourth pulse of the vocal input pulse (a) is supplied. The fourth pulse of the pulse (g) is generated at the leading edge of the fourth vocal pulse (a) to produce pulse (i') and, therefore, a function similar to those described above is continued so that the number of clock pulses corresponding to the third vocal pulse input (a) is stored in the latch 7b and the number of clock pulses corresponding to the fourth vocal pulse input (a) is stored in the latch 7c, respectively. The fifth pulse (d) generated subsequently thereto causes an increment pulse to be produced to advance the cycle [2] to cycle [3] (in FIG. 10).

In the third cycle [3], the central value is selected out of the outputs of the latches 7a, 7b and 7c (tentatively designated as A, B and C) corresponding to the number of pulses stored in the second cycle [2]. That is to say, the comparison function as shown in Table 1 is carried out in an array of 8-bit comparators 8a.

Table 1

| Comparator output | | | Selected channel |
|---|---|---|---|
| [A] > [B] | [B] > [C] | | [B] |
| | [B] ≦ [C] | [A] > [C] | [C] |
| | | [A] ≦ [C] | [A] |
| [A] ≦ [B] | [B] > [C] | [A] > [C] | [A] |
| | | [A] ≦ [C] | [C] |
| | [B] ≦ [C] | | [B] |

In other words, one of the outputs A, B, and C is fed out from the data multiplexor 8b (FIG. 3) having the data thereof opened by the pusle (m) from the circuit control unit 12d and, at the same time, is stored in the 8-bit latch 9a (FIG. 4) by the action of the pulse (n) fed from the circuit control unit 12d. Since the pulse (f) is fed out from the circuit control unit 12d simultaneously with the pulse (n), the flip-flop circuit 4e shown in FIG. 2 is reset and the output is changed over to the $\overline{Q}$ terminal side. Accordingly, the 300 Hz clock pulse is applied from the 300 Hz clock pulse generator 6b through the AND circuit 4h, OR circuit 4g and AND circuit 4d to the 8-bit counter 5. Following the pulse (m), the circuit control unit 12d applies an increment pulse to the 4-bit counter 12c to advance the cycle [3] to the fourth cycle [4].

In said fourth cycle [4] in which the mora pause is detected, the 8-bit counter 5 counts the 300 Hz clock pulses for each pulse (d) and stores the number of clock pulses in the latch 7d for each pulse (k) from the circuit control unit 12d. The output of the latch 7d is transmitted to one of the input terminals of the comparator circuit 11a, to the other input terminal of which is applied a signal corresponding to a suitable mora pause. Assuming that the output A of the latch 7d is larger than the comparison reference output B (A ≧ B), that is to say, when the output 7d is larger than the output predetermined as being suitable for the mora pause, the comparator circuit 11a produces the mora pause pulse (s). While, in the case of A < B, the comparator circuit 11a feeds out the voiced pulse (t). 11b and 11c are AND circuits for transmitting said signal (s) or (t), respectively, depending on the application of the timing pulse (r) from said circuit control unit 12d. If the voiced pulse (t) is output from the comparator circuit 11a, the aforementioned operation is repeated until a mora pause pulse (s) appears. When the first pulse (a) of the next mora is detected and the pulse (s) appears, the circuit control unit 12d provides the pulses (e), (l), (j), (j') and (j'') (in FIG. 6). Accordingly, the flip-flop circuit 4e shown in FIG. 2 is set and the sequence is changed over to the 10 KHz clock pulse generator circuit 6a and, thereafter, the 8-bit counter 5 counts 10 KHz clock pulses. Also, the latches 7a through 7d are cleared. When the first pulse (d) in the second mora is provided, an increment pulse is applied to the 4-bit counter 12c to advance the fourth cycle [4] to fifth cycle [5].

Since the operations in the fifth cycle to twelfth cycle are identical to those already described, their description is omitted. The latch 9b shown in FIG. 4 stores the central value of the second mora, and the latch 9c stores the central value of the third mora. Further, upon detecting a mora pause pulse (h) (in FIG. 11) in the third mora, the circuit control unit 12d provides the pulse (c) as a word end signal to cut off the voice signal input.

The most significant (upper) four bits of the outputs of the latches 9a to 9c are applied to the inputs of the adders 10a to 10c, respectively, to be added to the original 8 bits, thereby to provide the central value with a certain width. This is because the latch 9a does not always coincide with the latch 9b due to the variations peculiar to the human voice even if the tones are on the same level. Therefore, it is necessary to provide a tonal difference wider than one scale when a tonal change exists in the generated voice.

Then, the first comparators array 10d compares the signal [1] from the latch 9a with the signal [2] from the adder 10a, and the signal [3] from the latch 9b with the signal [4] from the adder 10b. Meanwhile the second comparators array 10e compares the signal [1] from the latch 9b with the signal [2] from the adder 10b, and the signal [3] from the latch 9c with the signal [4] from the adder 10c. As a result of these comparing operations, 2-bit data as shown in Table 2 are produced. For example, if the tone of a word composed of three moras changes as shown in FIG. 12A, outputs (11, 01) will be generated.

Table 2

| Comparator output | | 2-bit data |
|---|---|---|
| Input > Input (1) (3) | Input > Input (1) (4) | 11 (Tone up) |
| | Input ≦ Input (1) (4) | 10 (Level tone) |
| Input ≦ Input (1) (3) | Input ≧ Input (2) (3) | 10 (Level tone) |
| | Input < Input (2) (3) | 01 (Tone down) |

Figures 12A, 12B, 12C, 12D, 13:
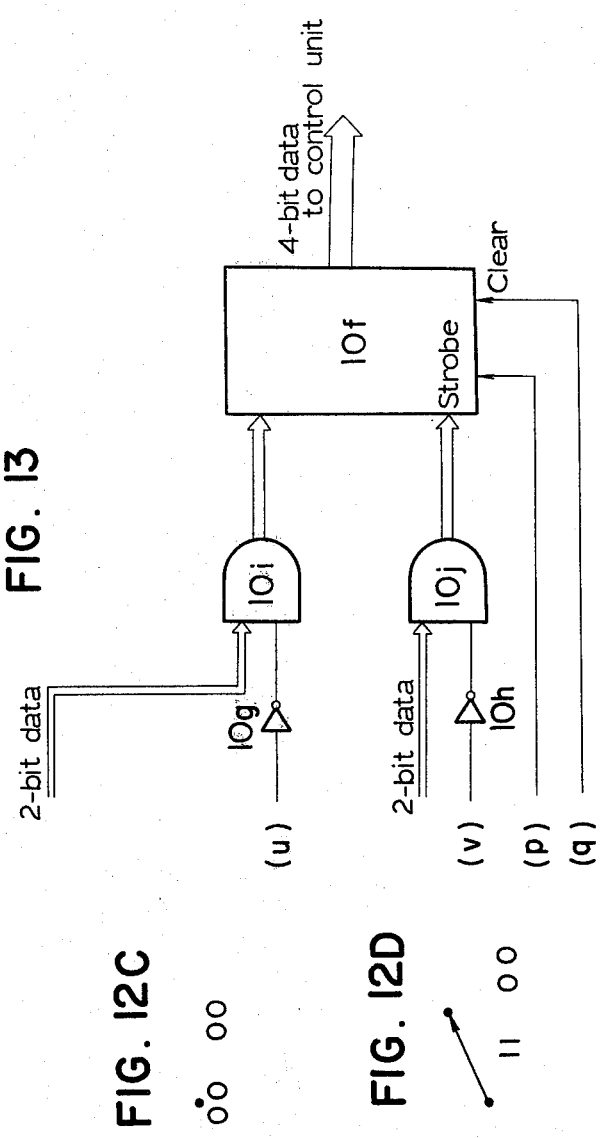
FIGS. 12A through D are diagrams illustrating the change of moras.
FIG. 13 is a circuit diagram of another preferred embodiment of the tonal change detecting circuit shown in FIG. 4.
Figure 14:
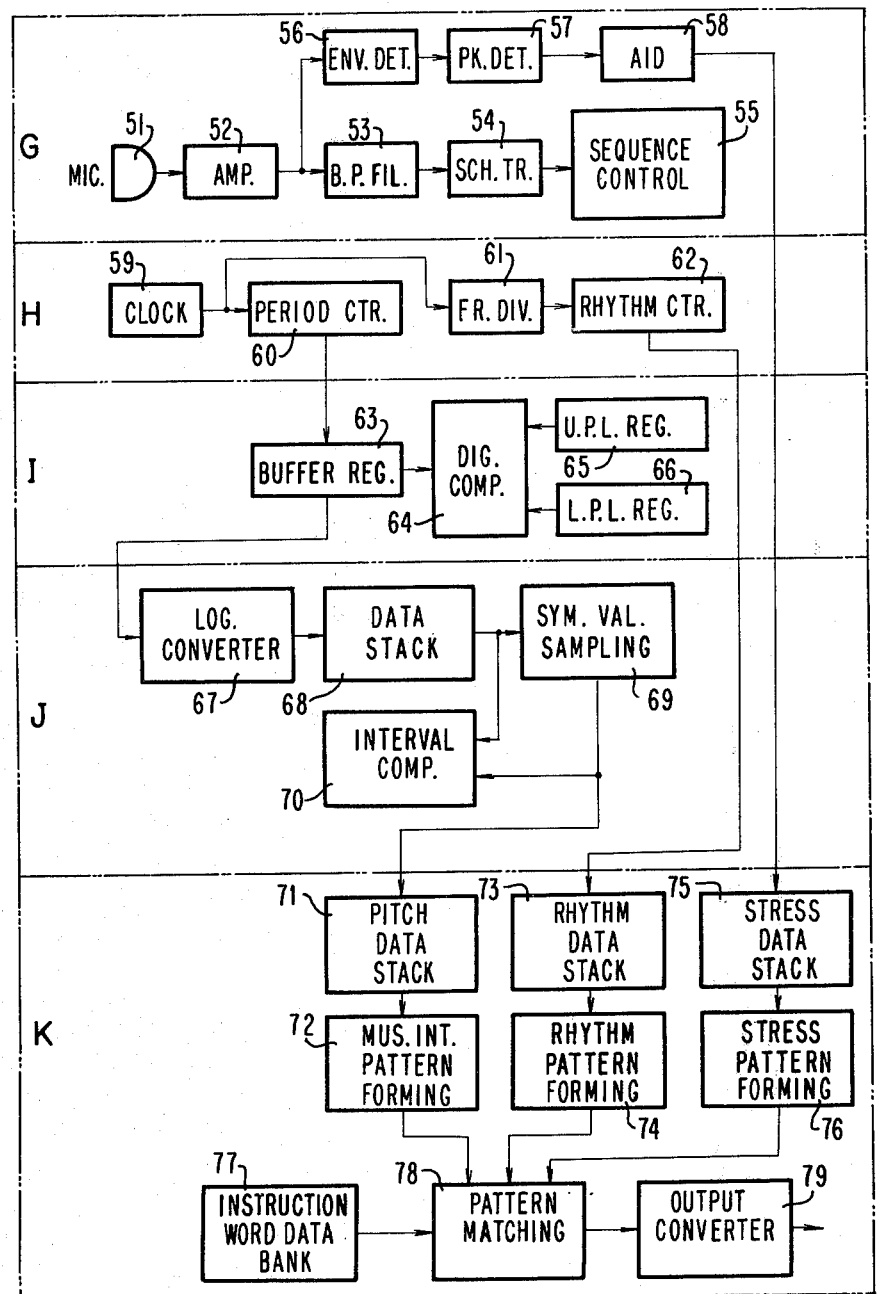
FIG. 14 is a block diagram of another embodiment of the voice identification system according to the present invention.

The tonal change as shown in FIG. 12B produces outputs (10, 11). Nine combinations of these outputs are possible in all. These combinations are stored in the 4-bit latch 10f by the action of the pulse (p) from the circuit control unit 12d and used to control an electric motor, for example, for "grasping" action of the artificial hands. Upon completing such a "grasping" action, the circuit control unit 12d provides the pulse signal (q) for clearing the 4-bit latch 10f and, then, emits pulses (e), (l), (j), (j'), (j''), (O), (O') and (O'') to return the sequence to the initial state.

Although the foregoing description of the preferred embodiment has been set forth for the recognition of word composed of three moras, a word composed of one or two moras may be readily recognized as well. Hereinafter, the description will be made with reference to FIG. 13.

Assuming that only the first mora is input to the system, the sequence is advanced up to the third cycle in the same manner as mentioned hereinbefore to determine the symbolic value which is to be stored in the latch 9a. Then, the sequence is changed over to the 300 Hz clock pulse generator circuit 6b, and the 8-bit counter 5 counts the 300 Hz clock pulses. In this case, due to the absence of the second mora, the 8-bit counter 5 overflows to emit the pulse (h), and the circuit control unit 12d transmits the pulse (c) to reset the flip-flop circuit 4a for cutting off the vocal pulse input thereto. Immediately thereafter, the pulse (q) is provided for clearing the 4-bit latch 10f. At the same time, the circuit control unit 12d emits pulses (u) and (v) in FIG. 13 which, after being inverted through inverter circuits 10g and 10h, inhibits the outputs of the comparator arrays 10d and 10e at the AND circuits 10i and 10j. This supplies the pulse (p) to the input of the 4-bit latch 10f and the latter produces outputs (00,00) indicating the end of the work as shown in FIG. 12C.

In the case where the first and second moras are input to the system, but the third mora is not input, the sequence is advanced up to the seventh cycle in the manner as described previously. That is to say, the symbolic values of the first and second moras are stored in the latches 9a and 9b, respectively, and the 8-bit counter 5 counts 300 Hz clock pulses. In this case, since the third mora does not appear, the 8-bit counter 5 overflows to emit the pulse (h). Therefore, the flip-flop circuit 4a is reset by the pulse (c). Then, 4-bit latch 10f is cleared by the pulse (q) and the circuit control unit 12d provides only the pulse (v). This causes the pulse (p) to be applied and only the output of the comparators array 10d to be fed through the AND circuit 10i to the input of the 4-bit latch 10f. This input comprises, for example, (11, 00) as shown in FIG. 12D.

It is to be noted that a word composed of more than three moras can be recognized by applying thereto the same principle as already described. Further, a microcomputer may be adopted for executing the identification or detection processing of the tonal change in the aforementioned preferred embodiment.

Also, the classification of tonal changes is not limited to three patterns (namely, tone up, tone down, and level tone with respect to the preceding mora), but the classification of tonal changes may be further subdivided by modifying the tonal change detecting circuit D.

FIGS. 14 through 19 show another embodiment of the present invention. The letter G denotes a voice detecting circuit comprising component circuits 51 through 58, in which numeral 51 is a microphone attached onto the outer wall of trachea of the source person and 52 is an amplifier which may include a limiter for amplifying the output of the microphone 51 to an adequate level. 53 denotes a band-pass filter passing voice signals with a frequency band of approximately 50 to 250 Hz and it functions to sample the pitch component of voice signal which is a parameter representing the scale of voice as emitted from the source person. 54 is a Schmidt trigger circuit which converts the sine wave signal sampled in the band-pass filter 53 into a square wave signal and functions to further eliminate waves other than the pitch components through its hysteresis characteristic. 55 denotes a sequence controller for determining the operating timing of the entire circuit of the system, to which a trigger is applied for actuating its function at a building-up time of the vocal input wave-form. 56 designates an envelope detector for detecting the amplitude of vocal signal, and 57 is a peak detector which detects the maximum value of amplitude of the signal fed from said envelope detector 56 and retains said maximum value. 58 is an analog-to-digital (A–D) converter for converting the analog value of the output said peak detector 57 into a digital value.

The letter H denotes a counter circuit composed of circuits 59 through 62, in which 59 is a clock pulse generator which substantially accurately generates clock pulse for measuring the period of the vocal signal. 60 is a period counter which counts the clock pulses during the duration of each signal pulse fed from said Schmidt trigger circuit 54 in accordance with the control signal from said sequence controller 55. 61 denotes a frequency divider circuit which divides the clock pulse frequency by a certain factor, for example, by 1/20. 62 is a rhythm counter which is actuated by the clocks having a frequency divided by said frequency divider circuit 61 for counting the time interval during which the sound is generated.

The letter I designates a digital band-pass filter composed of circuits 63 through 66, in which the circuit 63 is a counter buffer register for temporarily latching the content of said period counter 60. 64 is a digital comparator for comparing the content of said register 63 with the contents of an upper pitch limit register 65 and a lower pitch limit register 66 to be described hereinbelow. The digital comparator 64 provides its output when the content of said register is placed in a range defined by the contents of said upper and lower limit registers 65, 66. Said upper pitch limit register 65 stores a predetermined number of counts of the upper limit of the pitch, while the lower pitch limit register 66 stores a predetermined number of counts of the lower limit of the pitch. These limit registers 65 and 66 function to pass those signals having a frequency in the range defined by levels α and β in the frequency—time chart (FIG. 15b) showing the output wave-form of the band-pass filter 53.

The letter J designates a pitch stabilization and detection unit comprising circuits 67 through 70, in which the circuit 67 is a logarithmic converter which converts the frequency into musical interval for handling the pitch difference as a linear form. 68 denotes a data stack which stacks several data (four (4) data in the preferred embodiment under consideration) as supplied from said logarithmic converter 67. 69 is a symbolic value sampling circuit which determines a symbolic value out of several data stored in said data stack 68. 70 is an interval comparator for determining whether each of data stored in said data stack 68 is in a certain range, for example a half-tone, from said symbolic value determined by said symbolic value sampling circuit 69.

Letter K designates a pattern recognition unit composed of circuits 71 through 79, in which the circuit 71 is a pitch data stack for stacking for each mora a symbolic value of the pitch determined by said symbolic value sampling circuit. 72 denotes a musical interval pattern forming circuit for forming a pattern of the pitch data stacked in said pitch data stack 71, while 73 is a rhythm data stack for stacking the data obtained as sound length from the output of the aforementioned rhythm counter 62. 74 denotes a rhythm pattern forming circuit for forming a pattern of the rhythm data stacked in said rhythm data stack 73, and 75 is a stress data stack for stacking the data obtained as the stress of sound from the output of the analog-to-digital converter 58. 76 is a stress pattern forming circuit for forming a pattern of the stress data stacked in said stress data stack 75. 77 denotes an instruction word data bank in which predetermined pattern data of instruction words are stored. 78 is a pattern matching circuit which synthesizes patterns fed from said musical interval pattern forming circuit 72, rhythm pattern forming circuit 74 and stress pattern forming circuit 76. Said pattern matching circuit 78 also functions to compare the synthesized pattern with the pattern of the instruction word stored in the instruction word data bank. 79 denotes an output converter circuit for converting the output instruction word signal from said matching circuit 78 into a signal which can be used for controlling a machine or other equipment provided externally.

Description will now be made of the operation of the system according to the present invention having the aforementioned arrangement.

Figure 15A:
FIG. 15 is a wave-form diagram illustrating a waveform appearing at each component circuit of a voice detecting circuit of FIG. 14.
Figure 15B:
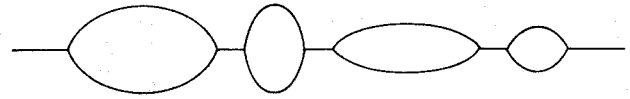
Figure 15C:

Assuming that the source person has emitted four moras as shown by the vocal input envelope in FIG. 15a, this vocal information is received by the microphone 51 provided on the outer wall of the trachea (preferably, at a position directly below the Adam's apple where higher frequency components and vocal tract characteristics have relatively smaller effects) and then fed to the amplifier 52 to be amplified therein. The vocal information has the pitch component thereof sampled by the band-pass filter 53 which passes the frequency band of, for example, 50 to 250 Hz. Then, the sampled sine-wave signal has those waves other than the pitch components thereof removed due to the hysteresis characteristic of the Schmidt trigger circuit 54 succeeding thereto and converted into a square-wave (FIG. 15c) by the Schmidt trigger circuit 54. For a female voice source, the pass band is may be shifted to a higher frequency.

Figure 15D:
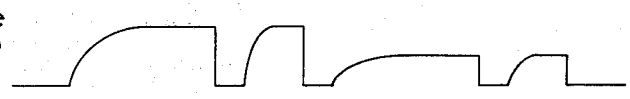

The output of the amplifier 52 is fed to the envelope detector 56 which detects its amplitude. The peak value of the amplitude is detected and retained by the peak detector 57 (FIG. 15d). Then, this peak value is converted into a digital value by the analog-to-digital converter 58.

In the arrangement of the system according to the present invention, the sequence controller 55 starts its operation at the building-up portion of the output pulse from the Schmidt trigger circuit 54. In addition to the aforementioned start at the building-up portion of said vocal input (hereinafter referred to as the first start), said sequence controller 55 has further two starting modes. Namely, it also starts when the period counter 60 overflows (for example, by 50 ms) between successive moras (hereinafter referred to as the second start) and when the rhythm counter 62 overflows (for example, by 500 ms) due to the end of instruction word (hereinafter referred to as the third start). In this case, the time period to be determined as a discontinuation interval is that in which the period counter 60 overflows, but the rhythm counter 62 does not overflow.

The sequence of operation will now be described with reference to the flow charts shown in FIG. 16 and the succeeding drawings.

Figure 16:
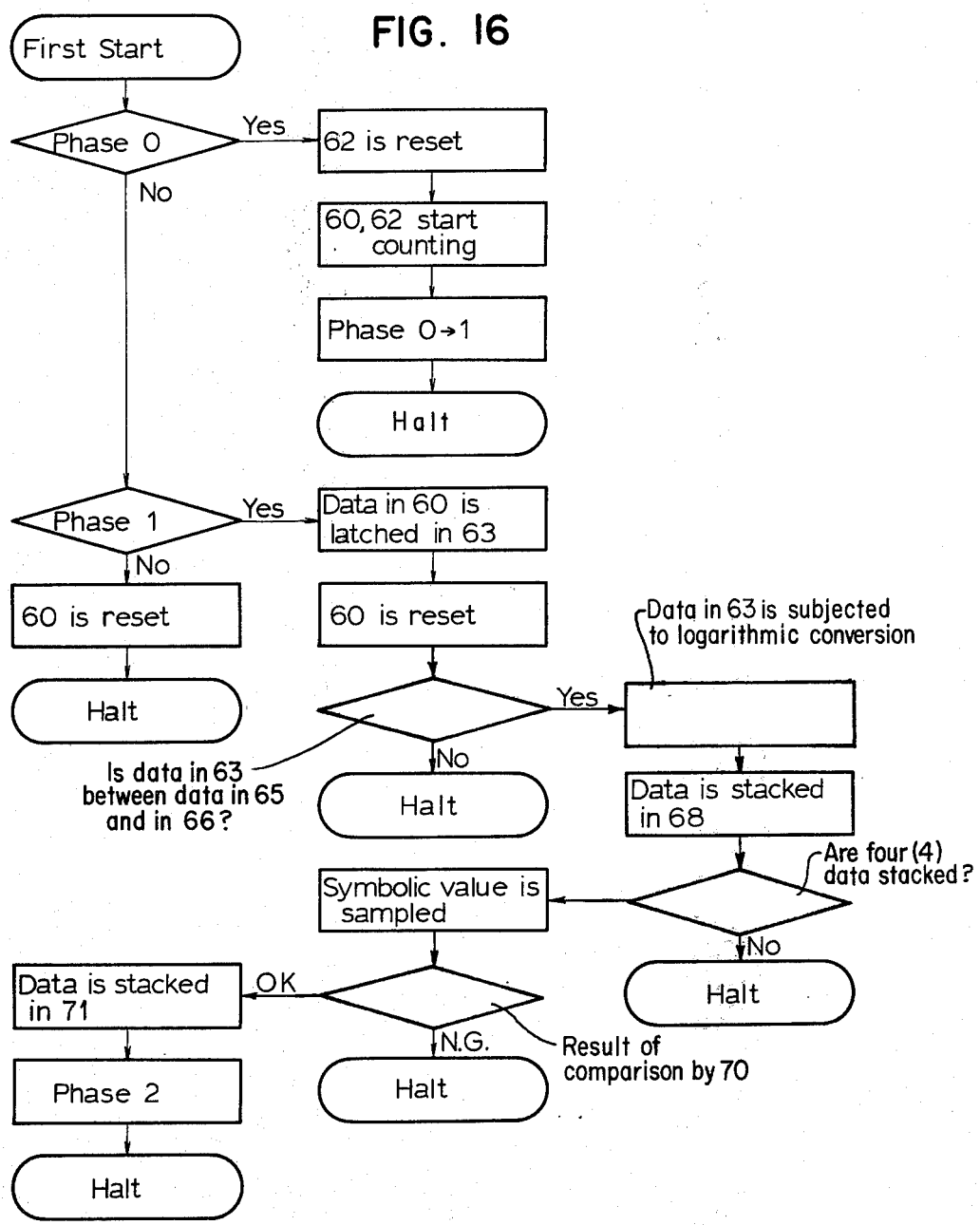
FIGS. 16 through 18 are flow charts for use in the description of the operation of the device and FIG. 19 is a diagram showing a pattern forming of instruction words.

Referring now to FIG. 16, the equipment embodying the system according to the present invention takes four states comprising a state in which the system is waiting for the start of mora, a state in which the data in input, a state in which the system is waiting for a mora pause, and a state in which data do not comprise instruction words and are rejected. These four states are designated as phases 0 through 3, respectively, in this order.

Since the state is in the phase 0 at the start of the first start of the sequence controller 55, the rhythm counter 62 is reset. Then, the clock pulse generator 59 generates its output, and the period counter 60 and the rhythm counter 62 start their counting operation. At this time, the occurrence of a vocal input causes the state to be shifted from phase 0 to 1, namely, the start-waiting state, and the sequence controller 55 is held.

When the building-up portion of the next pulse is fed from the Schmidt trigger circuit 54 into the sequence controller 55, the data in the period counter 60 is latched in the counter buffer register 63 because now the state is not in phase 0 but in phase 1. When the pitch data is input, the data in the period counter 60 is latched in the counter buffer register 63 and then the period counter 60 is reset and starts to count clock pulses again. Subsequently the data latched in the counter buffer register 63 is compared in the digital comparator 64 with the values preset in the upper and lower pitch limit registers 65 and 66, namely, values at the levels α and β shown in FIG. 15b. If the data fed from the register 63 is outside the range defined by the data in the registers 65 and 66, the system takes a waiting state until the next data is input. If the data fed from the register 63 is in said range defined by the preset values α and β, the data in the counter buffer register 63 is subjected to a logarithmic conversion in the logarithmic converter circuit 67 and the converted data is stacked in the data stack 68. Thereafter, the aforementioned operation is repeated to determined whether the number of data in the data stack 68 has reached a predetermined value or not. If said predetermined value is not reached, the input-waiting state is taken and the data are repetitively taken in. When a predetermined number of data, namely four (4) data in the preferred embodiment are stacked in the data stack 68, the symbolic value sampling circuit 69 determines a mean value, which is then input into the interval comparator 70 as a symbolic value. Said interval comparator 70 compares each data from the data stack 68 with the symbolic value determined as above. If any one of the data in the data stack 68 is outside said range, the data stack 68 discharges the initially stacked data and takes an input-waiting state. Then, the aforementioned operation is repeated and the data are again input and the symbolic value sampling circuit 69 determines the mean value of the data input as mentioned above. The interval comparator 70 compares each data with the symbolic value. This operation is repeated until all data are brought into a certain range from the symbolic value. When all data are brought into a certain range from the symbolic value, said symbolic value is input into the musical interval data stack 71 and stacked therein. Under these conditions, the system takes the mora-pause waiting state, namely, phase 2 waiting for the next input.

Then, if the pulse input is provided from the Schmidt trigger circuit 54, the period counter 60 is reset, but the data are not taken in when the system is in the input-waiting state, because the state is neither in phase 0 nor in phase 1. Thereafter, the sequence controller 55 causes the aforementioned operation to be repeated until the occurrence of the second start.

Figure 17:
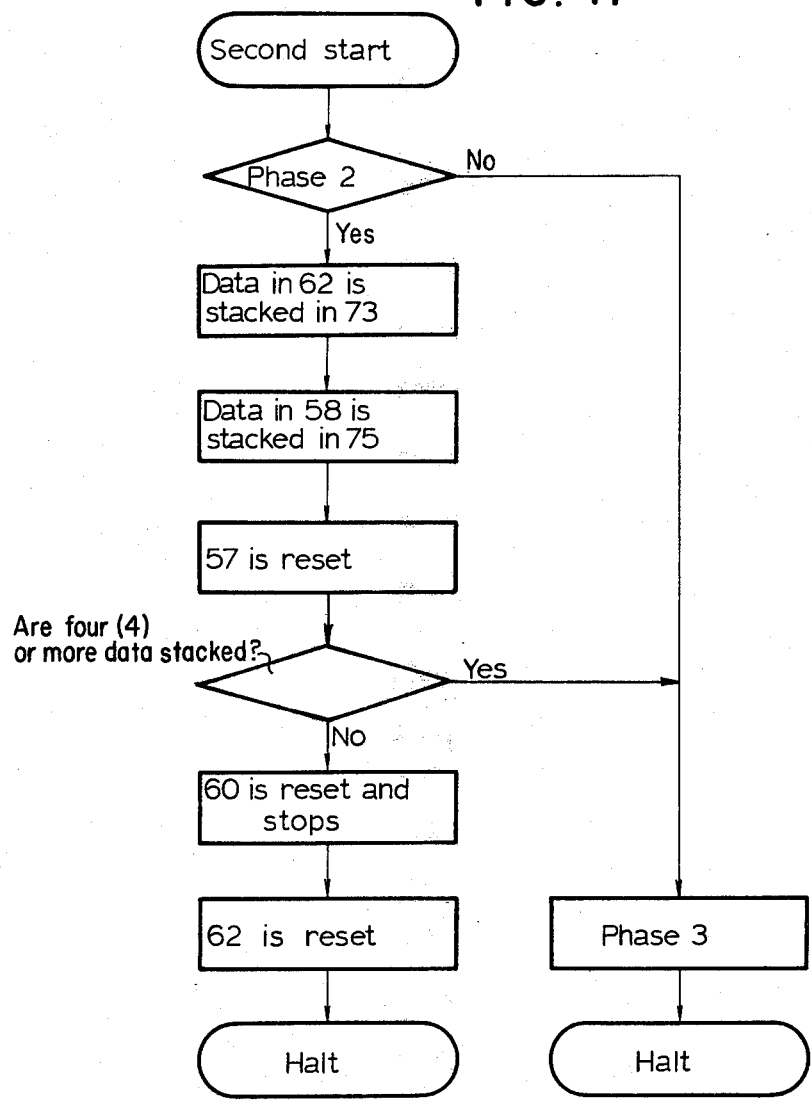

Referring now to FIG. 17, at the second start of the sequence controller 55, namely, when the period counter 60 overflows, whether the state is phase 2 or not is first determined. If the state is in phase 1 indicating that stable pitch data have not been obtained, the state is shifted to phase 3 to reject the input words, with the system taking the input-waiting state. If the state is in phase 3, the operation is identical to that described immediately above.

If the state is in phase 2, the data in the rhythm counter 62 are stacked in the rhythm data stack 73 and the data in the A-D converter 58 are stacked in the stress data stack 75. Then, it is determined whether the number of the data in said musical interval data stack 71, rhythm data stack 73 and stress data stack 75 is four or more. If said number of data is less than four, the period counter 60 is reset and stops its counting operation. While, the rhythm counter 62 is reset and starts counting again, with the system taking the input-waiting state.

Then, the aforementioned operation is repeated again from the first start, and when four or more data are stacked in the data stacks, the state is shifted to phase 3 to reject the input word as data not being an instruction word. Thus, the system takes the input-waiting state.

Figure 18:
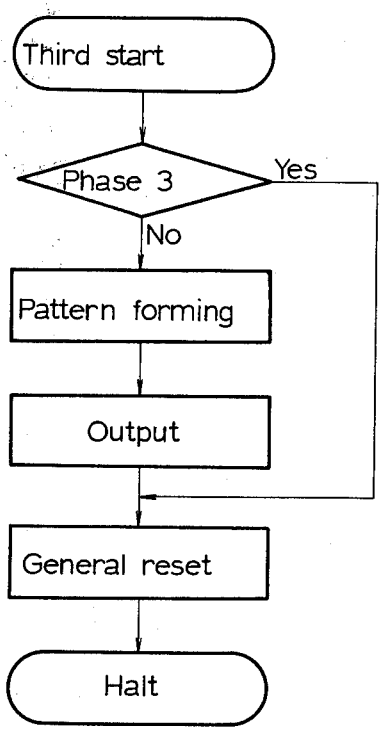

Referring now to FIG. 18, at the third start of the sequence controller 55, namely, when the rhythm counter 62 overflows, whether the state is in phase 3 or not is determined. If the state is in phase 3, the system is generally reset. In other words, all registers are reset and the counter operation is stopped. The state is shifted to phase 0 and the sequence controller 55 stops its function.

Figure 19:
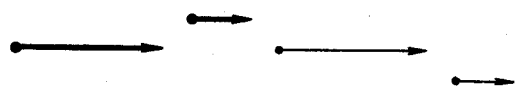
Figure 19:
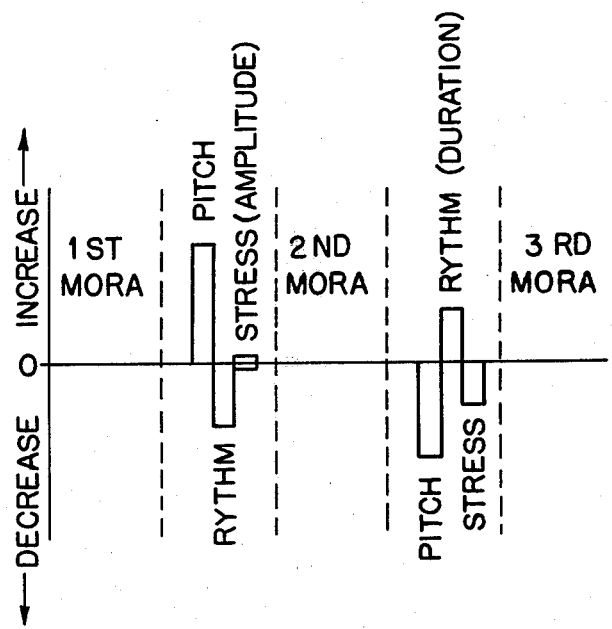

If the state is not in phase 3, the data in the musical interval (pitch) data stack 71, rhythm data stack 73 and the stress data stack 75 are formed into patterns, in the musical interval pattern forming circuit 72, rhythm pattern forming circuit 74 and stress pattern forming circuit 76 through a relative comparison of the respective data, and the data thus formed into patterns are synthesized in the pattern matching circuit 78 into a pattern as shown in FIG. 19. Then this pattern is compared in said pattern matching circuit 78 with the pattern from the instruction word data bank 77 in order to determine which instruction the pattern obtained from the voice sound is, and what kind of function the controlled system such as a machine, is caused to make. This output instruction is converted by the output converter circuit 79 into a signal for causing the controlled machine to make a predetermined function. Upon completing this function, the system is generally reset and shifted to the instruction words waiting state, waiting for an input.

As fully described hereinbefore, it will be understood that the present invention provides a novel voice identification system in which a microphone is provided on the outer wall of the trachea of the source person where the noise level is relatively low and the voice is subjected to detection by being divided into moras. Also, according to the present invention, the waves in the initial periods which are not stabilized as a voice sound are removed and the remaining periods are picked up for determining a value symbolic of the number of clock pulses therein, and the tonal change pattern exhibited by a plurality of thus determined symbolic values is subjected to assortment for providing a specific controlling function over a device to be controlled. The system disclosed by way of the second embodiment detects the pitch, duration and stress of sound from each of the instruction words and synthesizes these factors into musical notes. Thus, a higher rate of voice recognition can be achieved regardless of whether the voice comprises ordinary sounds or humming sounds. Also, the adoption of a simplified pattern matching system ensures a higher rate of voice recognition. Further, the combination of two or three patterns permits a plurality of instruction words to be properly identified.

What is claimed is:

1. A voiced instruction identification system comprising a means for detecting sound which is generated in a form divided into moras, through a microphone with provisions for mounting on a human body;
   a means for sampling a fundamental wave from the detected sound;
   a means for determining a value of at least one feature of the fundamental wave for each mora;
   a means for forming a pattern in respect to relative changes of the value of said feature between contiguous moras; and
   a means for identifying an instruction from the formed pattern.

2. A voiced instruction identification system as defined by claim 1, wherein said value determining means includes a means for determining a representative value of frequencies from the fundamental wave of each mora.

3. A voiced instruction identification system as defined by claim 1, wherein said value determining means includes a means for determining a representative value of frequencies from the fundamental wave of each mora and a means for determining a representative value in respect to at least one of the amplitudes of the fundamental wave of each mora and the duration of each mora.

4. A voiced instruction identification system as defined by claim 2, wherein the fundamental wave for each mora has several periods, said frequency representative value determining means includes means for eliminating an initial few of said periods of the fundamental wave for each mora and determining a representative value from the succeeding few periods of the fundamental wave for such mora.

5. A voiced instruction identification system as defined by claim 3, wherein the fundamental wave for each mora has several periods, said frequency representative value determining means including means eliminating the initial few of said periods of the fundamental wave for each mora and determining a representative value from the succeeding few periods of the fundamental wave for such mora.

6. A voiced instruction identification system as defined by claim 2, wherein said frequency representative value determining means includes a means for determining a representative value for each mora from frequencies of a few periods of the fundamental wave when said frequencies are within a certain range.

7. A voiced instruction identification system as defined by claim 3, said frequency representative value determining means includes a means for determining a representative value for each mora from frequencies of a few periods of the fundamental wave when said frequencies are within a certain range.

8. A voiced instruction identification system, particularly for controlling a powered device by voiced instructions of a source person, comprising:
   means including a microphone and band pass filter for passing a limited frequency band of electrical signals corresponding to spoken moras;
   Schmidt trigger means for converting said limited frequency band of electrical signals from sine wave form to square wave pulses with several Schmidt pulses per mora;
   means for eliminating the initial unstable portion of the Schmidt pulses for each mora;
   a clock pulse source of frequency greater than frequencies in said band, and counter means responsive in each mora to Schmidt pulses occurring subsequent to said initial unstable portion for counting the number of clock pulses in each of a selected number of said subsequent Schmidt pulses so as to produce a selected number of clock pulse totals for each mora;
   symbolic value sampling means for selecting a representative one of said clock pulse totals and producing an output corresponding quantatively to said representative total, for each mora;
   tonal pattern change detecting means for detecting a change in said symbolic value sampling means output between consecutively occurring ones of said moras, such that the detected changes provide a tonal change pattern usable to identify the spoken command comprising said moras.

9. The apparatus of claim 8, including means responsive to completion of said selected number of Schmidt pulses in a given mora and to a subsequent mora pause exceeding a reference time for resetting said eliminating means and counter means upon restarting of Schmidt pulses for the next mora.

10. The apparatus of claim 9, including means responsive to a mora pause for occurrence of a preselected number of moras corresponding to the number of moras in the spoken command to be identified, for causing said tonal pattern change detecting means to detect said changes.

11. The apparatus of claim 8, in which said tonal pattern change detecting means includes a pitch data stack for sequentially storing said symbolic value sampling means outputs each quantatively corresponding to a respective clock pulse total, said apparatus further including a rhythm counter and means supplying same with further clock pulses for counting the time interval during which the sound for each mora is present, and a rhythm data stack for receiving count data from said rhythm counter for each of the desired number of moras.

12. The apparatus of claim 11, further including means responsive to the output of said microphone for detecting the peak amplitude value of each sound mora and providing a digital representation thereof, and a stress data stack for storing said digitized amplitude values for the desired number of moras, whereby changes, from mora to mora, in the data in the pitch, rhythm and stress data stacks may be compared to corresponding changes in a reference instruction word to identify the spoken word applied to the microphone.

* * * * *

UNITED STATES PATENT OFFICE
CERTIFICATE OF CORRECTION

Patent No. 4 178 472  Dated December 11, 1979

Inventor(s) Hiroyasu Funakubo and Masataka Shiba

It is certified that error appears in the above-identified patent and that said Letters Patent are hereby corrected as shown below:

Col. 14, line 10; change "for" to ---after---.

Signed and Sealed this

Eighteenth Day of March 1980

[SEAL]

Attest:

SIDNEY A. DIAMOND

Attesting Officer  Commissioner of Patents and Trademarks